United States Patent [19]

DiSimone et al.

[11] Patent Number: 5,707,666
[45] Date of Patent: Jan. 13, 1998

[54] COMBINED MOLD CARRIER AND LINKAGE APPARATUS

[75] Inventors: John DiSimone, Woodbridge; Robert D. Schad, Toronto, both of Canada

[73] Assignee: Husky Injection Molding Systems Ltd., Canada

[21] Appl. No.: 440,643

[22] Filed: May 15, 1995

Related U.S. Application Data

[63] Continuation-in-part of Ser. No. 255,004, Jun. 7, 1994, Pat. No. 5,578,333, which is a continuation of Ser. No. 231,661, Apr. 25, 1994, abandoned.

[51] Int. Cl.⁶ .................................................. B29C 45/64
[52] U.S. Cl. ...................... 425/588; 425/338; 425/451.5; 425/589; 425/592
[58] Field of Search .......................... 425/588, 589, 425/592, 595, 450.1, 451.3, 451.5, 451.9, 338, 190

[56] References Cited

U.S. PATENT DOCUMENTS

| | | | |
|---|---|---|---|
| 2,586,474 | 2/1952 | Moore | 425/338 |
| 2,966,183 | 12/1960 | Werner | 425/338 |
| 3,209,405 | 10/1965 | Loewenfeld | 425/338 |
| 3,518,724 | 7/1970 | Book | 425/338 |
| 3,659,997 | 5/1972 | Rees | 425/575 |
| 3,767,352 | 10/1973 | Rees | 425/441 |
| 3,868,204 | 2/1975 | Bongers | 425/451.5 |
| 3,941,548 | 3/1976 | Bruder | 425/450.1 |
| 4,207,051 | 6/1980 | Wright et al. | 425/556 |
| 4,408,981 | 10/1983 | Brown | 425/589 |
| 4,718,845 | 1/1988 | Sheffield et al. | 425/589 |
| 4,929,166 | 5/1990 | DiSimone et al. | 425/190 |
| 5,104,308 | 4/1992 | Morton et al. | 425/592 |

*Primary Examiner*—James P. Mackey
*Attorney, Agent, or Firm*—Bachman & LaPointe, P.C.

[57] ABSTRACT

An injection molding machine having a plurality of axially arranged mold stations including structure for supporting sets of mold plates and a mechanism for opening, closing and overstroking mold plates.

24 Claims, 8 Drawing Sheets

COMBINED MOLD CARRIER AND LINKAGE APPARATUS

CROSS-REFERENCE TO RELATED APPLICATIONS

This application is a Continuation-In-Part of U.S. patent application Ser. No. 08/255,004, filed Jun. 7, 1994, now U.S. Pat. No. 5,578,333, which in turn is a Continuation of U.S. patent application Ser. No. 08/231,661, filed Apr. 25, 1994, now abandoned.

BACKGROUND OF THE INVENTION

The present invention relates to injection molding machines and relates, in particular, to machines having a plurality of axially arranged mold stations each station having cooperating mold plates defining mold cavities in well known fashion. This mold arrangement is known in the art as a stack mold.

In prior art machines a plurality of sets of mold plates, one set of mold plates for each mold station, are operated, open and closed, by a variety of mechanisms many of which are complicated and obstruct access for servicing molds at the various mold stations. Typical prior art mold operating mechanisms are shown in FIG. 2 of U.S. Pat. No. 3,659,997 and FIG. 1 of U.S. Pat. No. 4,207,051.

In prior art arrangements there are numerous problems relating to alignment, support and precise movement of mold plates in order to achieve the highest quality molded product with minimum wear and tear of the mechanisms utilized to open and close the mold cavity at the various mold stations.

One other problem is the lack of adequate access in the open mold condition to service the molds and mold plates and to replace molds without having to dismantle the molding machine.

That is, many prior art units support the mold plates on the machine tie rods which involves a cumbersome, time consuming, laborious task when one wishes to replace molds. Such a step frequently involves removal of tie rods.

Furthermore, it is desirable to provide a mold actuating mechanism that moves the various sets of mold plates from the open and closed positions so that all mold stations open and close simultaneously and precisely during the course of a continuous molding cycle.

In addition it is desirable to provide a mechanism that one can "overstroke" readily to increase access to service and replace molds and/or mold plates without major disassembly of the molding machine.

The term overstroke is intended to mean intentional opening of the various mold stations a distance beyond the normal open stroke distance of the normal cycle of operation.

A set of mold plates in the disclosed embodiment of the present invention includes mold plates, per se, and support plates to which the mold plates are attached, sometimes referred to collectively as a "set of plates".

OBJECTS OF THE INVENTION

A principal feature of the present invention is the provision of a novel means for supporting a stack mold having a plurality of molding stations.

A further important feature of the invention is the provision of a simple, durable mechanism for opening and closing all molds at a plurality of molding stations simultaneously, precisely and with uniform stroke.

A further feature is the provision of mold support means and mold actuating means which facilitates rapid, and convenient installation and removal of elements of multilevel molds (a plurality of axially arranged molding stations, i.e. stack mold) with minimum dismantling of molding machine.

A still further feature of the invention is the provision of a novel method of opening and closing a plurality of axially arranged mold stations simultaneously and precisely.

SUMMARY OF THE INVENTION

The present embodiment of the invention includes a first fixed platen and a second platen movable relative to the first platen and appropriate means for relatively moving the platens.

A mold arrangement is provided comprising a plurality of sets of movable plates defining a plurality of mold cavities between cooperating sets of plates, wherein said sets of plates are disposed axially to define a plurality of axially arranged mold stations operable to open and close simultaneously during cyclic molding machine operation.

A primary motion means or crank mechanism is pivotally connected to the central set of mold plates via a support member and is linked pivotally at opposed ends to the movable platen and to the fixed platen. The connection to the platens is accomplished by pivotally mounted links.

The primary crank mechanism straddles the injection molding machine and exists in the form of a pair of primary cranks which are preferably spaced outwardly of support means. To and fro motion of the movable platen actuates the primary crank mechanism maintaining the central mold plates equidistant from the fixed and movable platens as the molding machine cycles from open to closed positions.

A secondary motion means or crank mechanism, comprising opposed pairs of smaller cranks supported pivotally and individually by sets of mold plates which are positioned on opposite sides of the central set. One end of the secondary cranks are linked pivotally to opposite sides of the central plates.

The secondary cranks are disposed in opposed pairs and motion of the movable platen drives the primary cranks and in so doing drives the secondary cranks so that the primary and secondary cranks provide the motion to open and close the mold stations in a precise and simultaneous manner which will be more apparent as this specification proceeds.

While the disclosed embodiment of the invention discloses one pair of primary cranks and two pairs of secondary cranks operating and providing motion for four (4) mold stations it is entirely within the spirit and scope of the invention that the described crank arrangement be duplicated axially to operate many axially arranged mold stations.

Other features and advantages of the present invention will become more apparent from an examination of succeeding specification when read in conjunction with the appended drawings; in which:

DETAILED DESCRIPTION OF THE PREFERRED EMBODIMENTS AND METHODS

Figure 1:
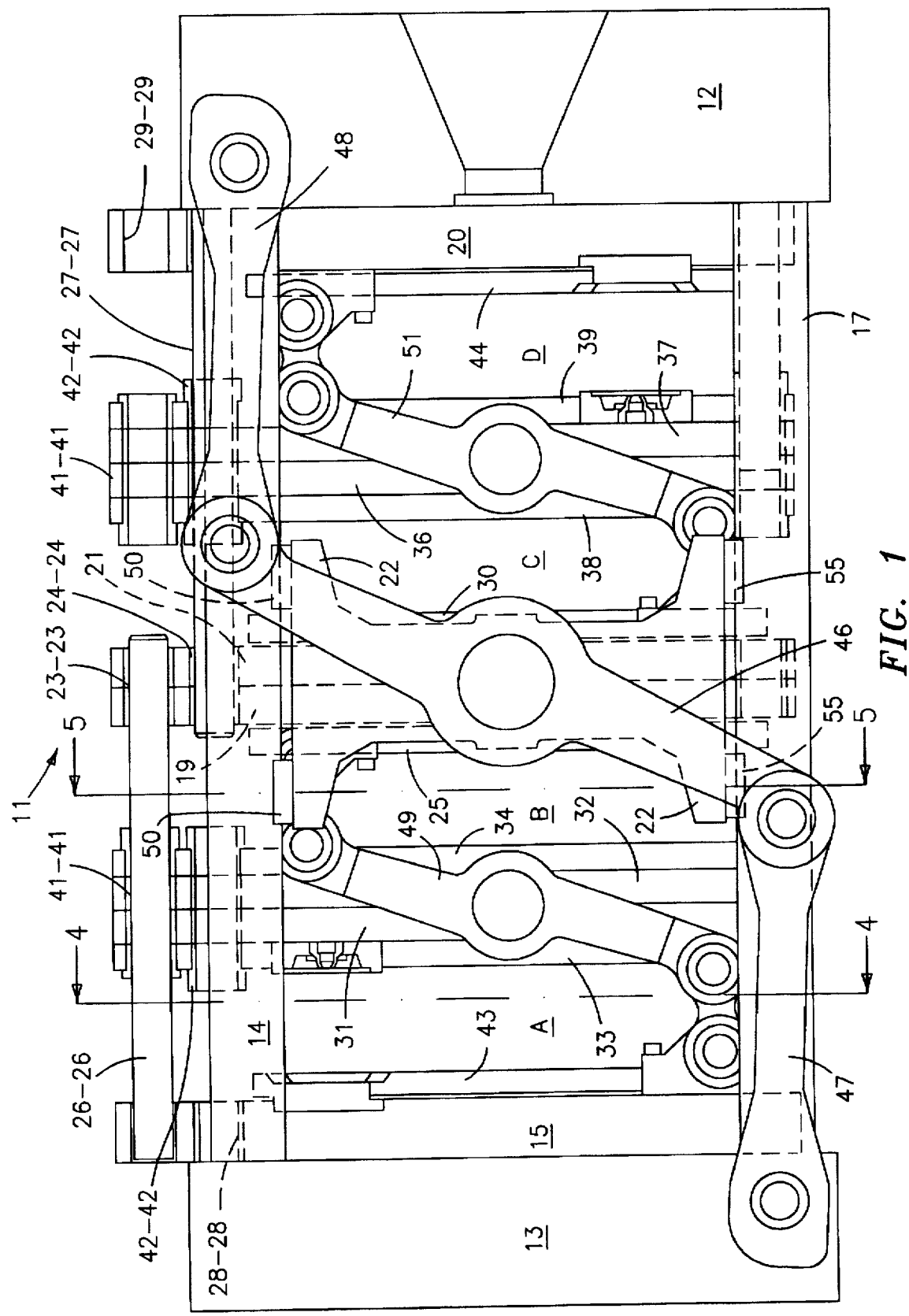
FIG. 1 is a side view of a portion of an injection molding machine showing a multi-level mold (axially arranged mold stations) in the open mold position.

Referring in detail to the drawings, in particular FIGS. 1, 2 4, and 6, the reference numeral 11 indicates, generally, a portion of an injection molding machine comprising a plurality of mold stations A, B, C and D, all in the open mold position, disposed between a fixed platen 12 and a movable platen 13 with a pair of upper tie bars 14 and 16 and a pair of lower tie bars 17 and 18.

Mold stations A and B are supplied with moldable material via supply conduit S and mold stations C and D are supplied via conduit S'.

The tie bars are secured at one end to fixed platen 12 and at the opposite end to a machine frame member, not shown.

In classical fashion the movable platen 13 is supported by and is moved, to and fro, along the tie bars to open and close the mold stations by conventional drive means such as a hydraulic ram, not shown.

A central set of mold support plates 19 and 21 carrying mold plates 25 and 30 are received in and supported by support member 22 in turn, carried movably by the lower pair of tie bars 17 and 18 and stabilized by engagement with an upper pair of the bars 14 and 16. The plates 19 and 21 and all associated mold plates comprising mold stations A–D are removable as an assembly by lifting the assembly vertically free of the support member 22.

Note that the support member 22 includes a pair of shoes or bearings 50 which engage and ride along upper tie bars 14 and 16 and a pair of shoes 55 which engage and ride along the lower tie bars 17 and 18 thereby guiding and stabilizing support member 22.

As is most apparent in FIG. 1 the upper end of the plates 19 and 21 are formed with primary and secondary sleeve bearings or bushings 23 and 24 operable to receive ends of guide or support pins 26 and 27 respectively. That is, a pair of pins 26—26 are received in a pair of primary bushings 23—23 and a pair of pins 27—27 are received in the secondary bushings 24—24. Reference numerals are hyphenated in the drawings to indicate pairs. Opposite ends of the pairs of pins 26—26 and 27—27 are fastened to the movable platen 13 and the fixed platen 12 by means of plates 15 and 20, respectively.

Figure 2:
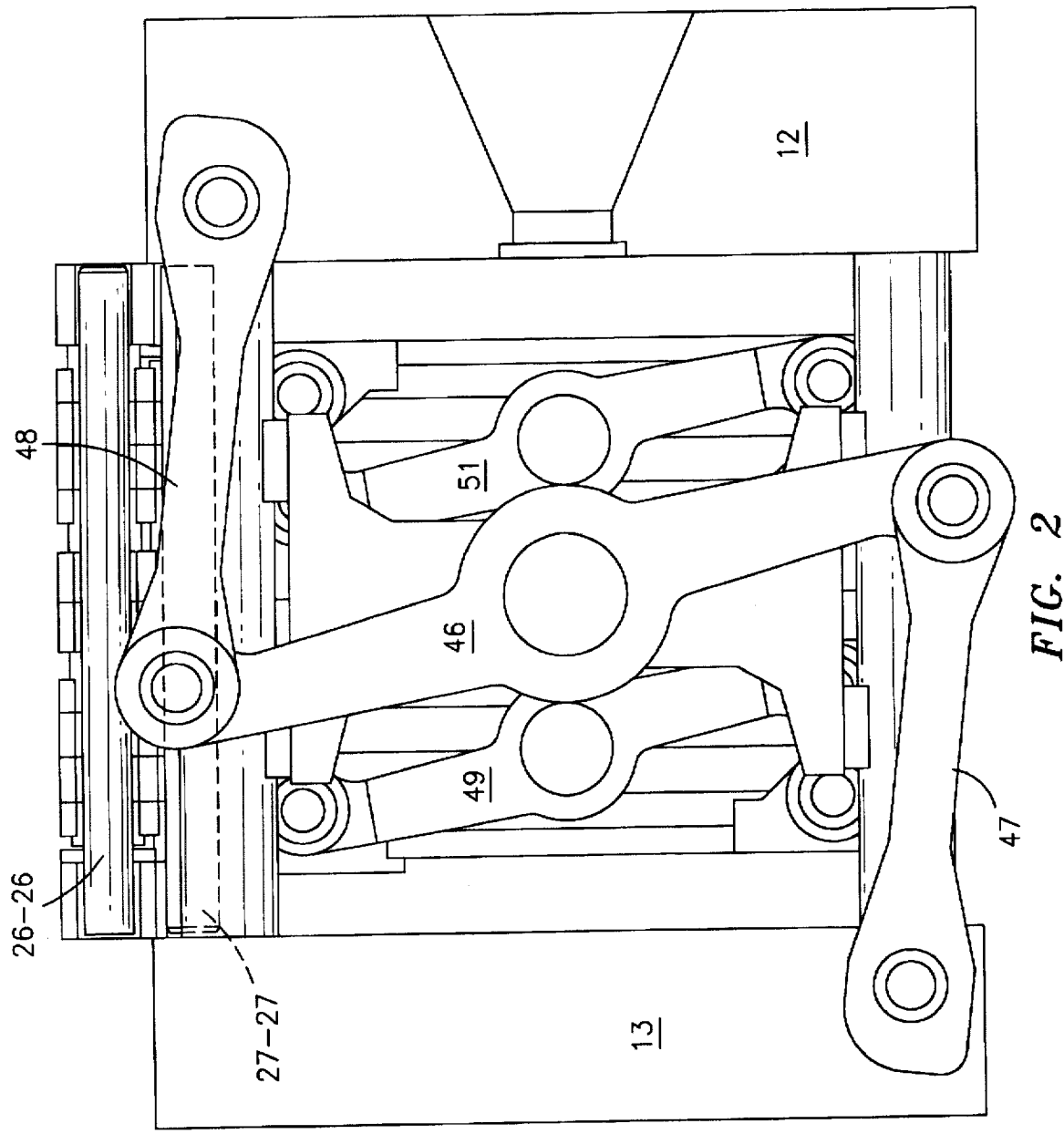
FIG. 2 is a view similar to the showing of FIG. 1 illustrating the closed mold position.

The reference numerals 28 and 29 denote pairs of clearance holes for the guide pins when the mold stations reach the closed position as is most apparent in FIG. 2.

A second set of plates 31 and 32, supporting mold plates 33 and 34, and a third set of plates 36 and 37 supporting mold plates 38 and 39 are also formed with pairs of primary and pairs of secondary bushings 41—41 and 42—42 respectively.

That is, the primary bushings 41—41 of the second set of plates 31 and 32 receive pins 26—26 to support the second set of plates while the pair of secondary bushings 42—42 provide additional support for the pair of pins 27—27 when the molds are in the closed position.

Correspondingly the third set of plates 36 and 37 are supported by the engagement of the pair of pins 27—27 in the secondary bushings 42—42 while the primary bushing 41—41 of this set of plates provide additional support for the pins 26—26 as the mold stations close.

The reference numeral 43 denotes the mold plate which cooperates with mold plate 33 while the reference numeral 44 denotes the mold plate which cooperates with mold plate 39.

A pair of primary cranks 46 (only one shown in FIG. 1) are mounted pivotally to the plate support member 22 on opposed sides of the member 22. Ends of the crank 46 are connected pivotally by means of pivot links 47 and 48 to movable platen 13 and fixed platen 12, respectively.

Each of the second and third sets of plates (31 and 32 and 36 and 37) support pivotally pairs of secondary cranks 49 and 51 (only one crank of each pair shown in FIG. 1).

One end of the secondary cranks are connected by pivot links 52 and 53 to central plates 19 and 21 and at their opposite ends are connected to plates 15 and 20 respectively.

Figure 3:
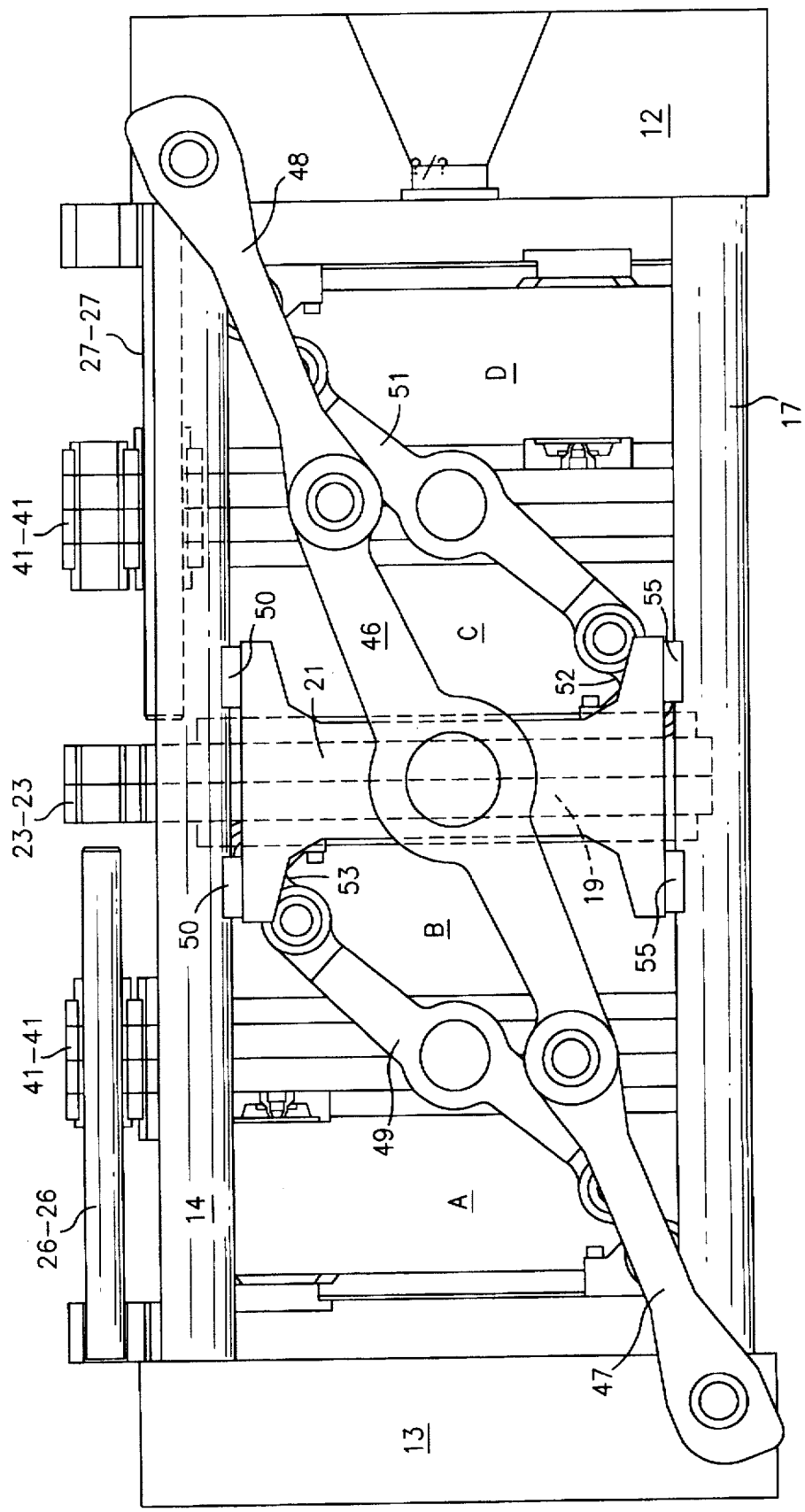
FIG. 3 is a schematic illustration of the overstroked position.
Figure 5:
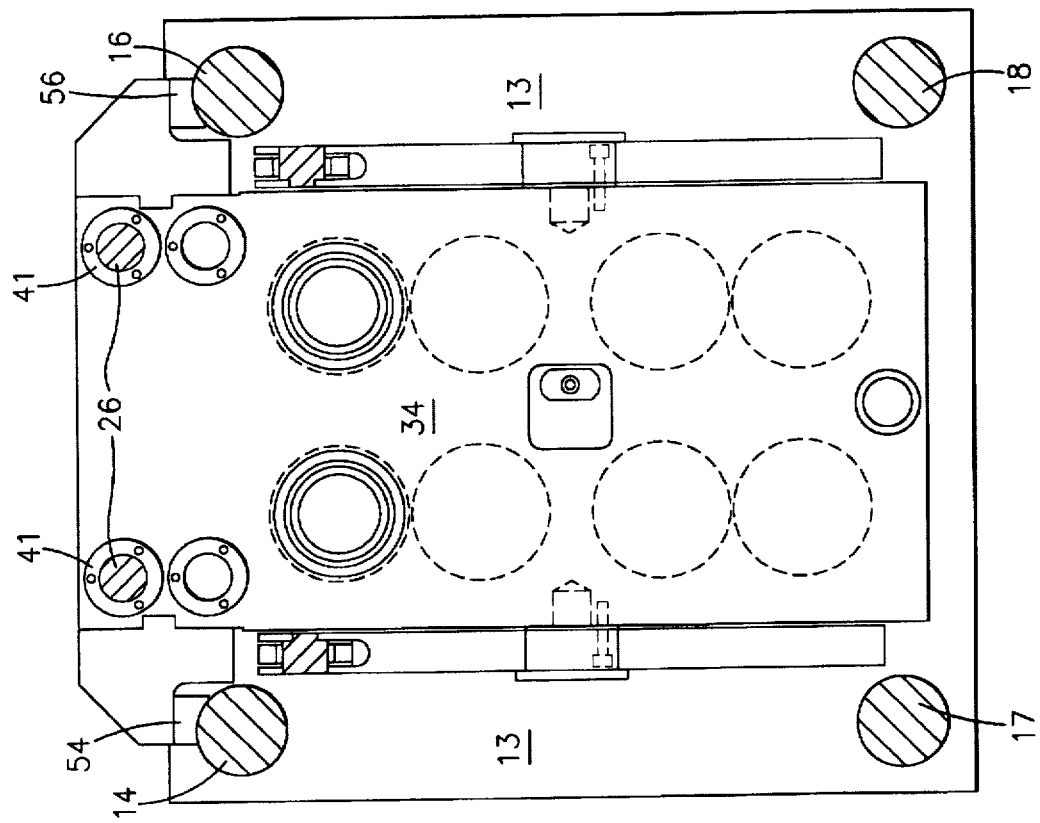
FIG. 5 is a vertical section of FIG. 1 in the plane of the line 5—5 as viewed in the direction of the arrows with the primary crank means removed.
Figure 4:
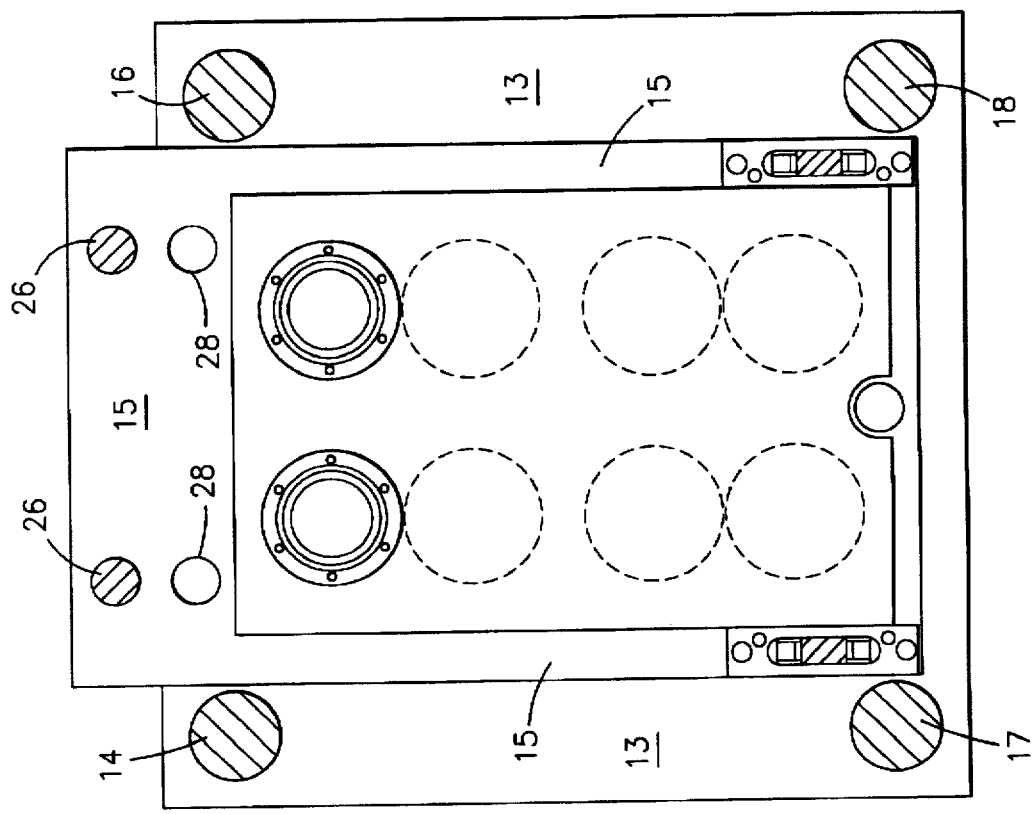
FIG. 4 is a vertical section of FIG. 1 in the plane of the line 4—4 as viewed in the direction of the arrows showing a mold face with the primary crank means removed.
Figure 6:
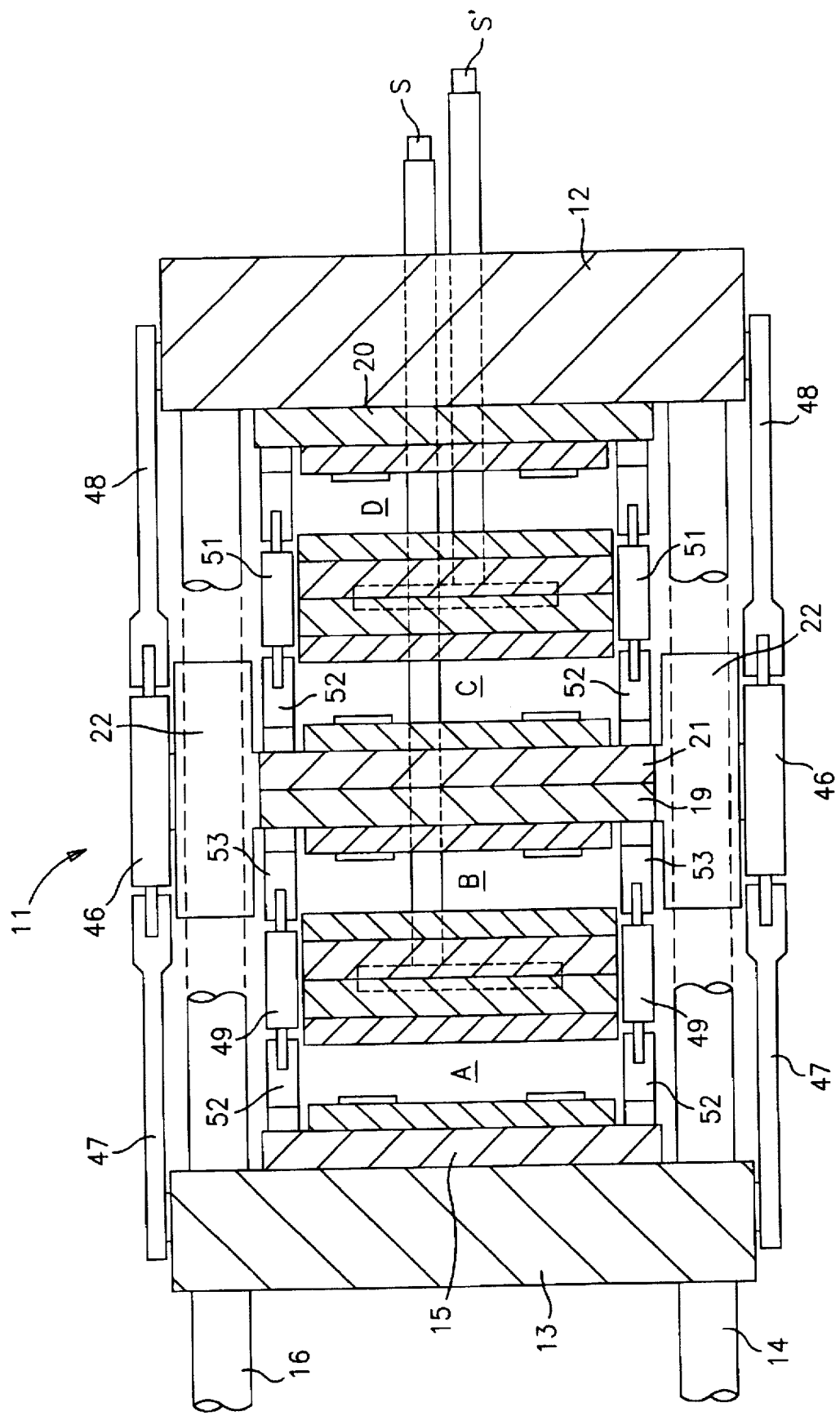
FIG. 6 is a top plan view of the various sets of mold plates showing, schematically, the mold stations in the open mold condition as well as the disposition of the primary and secondary crank means. Guide pins for the several sets of mold plates are not shown for purposes of clarity.

FIG. 3 shows the mold stations in the overstroked condition providing wide spacing between mold plates to facilitate servicing. Note that in the FIG. 3 position of the mold stations the pins 26—26 and 27—27 have withdrawn from central plates 19 and 21 leaving the ends of the pins without the support normally provided by central plates. In order to compensate for this loss of support in the overstroked condition the second and third sets of mold plates are provided with outriggers or auxiliary bearings 54 and 56 as best seen in FIG. 5. These bearings bear upon and move along the upper tier of tie bars 14 and 16.

While these bearings are operative during the normal open and close cycling of the various mold stations their utility is especially important when the molds are overstroked.

Note further that during the course of normal operation of the mold stations including overstroking the primary and secondary cranks and their connecting links operate with precision opening and closing all molds simultaneously and the central mold set remains equidistant from the movable and stationary plates at all times.

Figure 7:
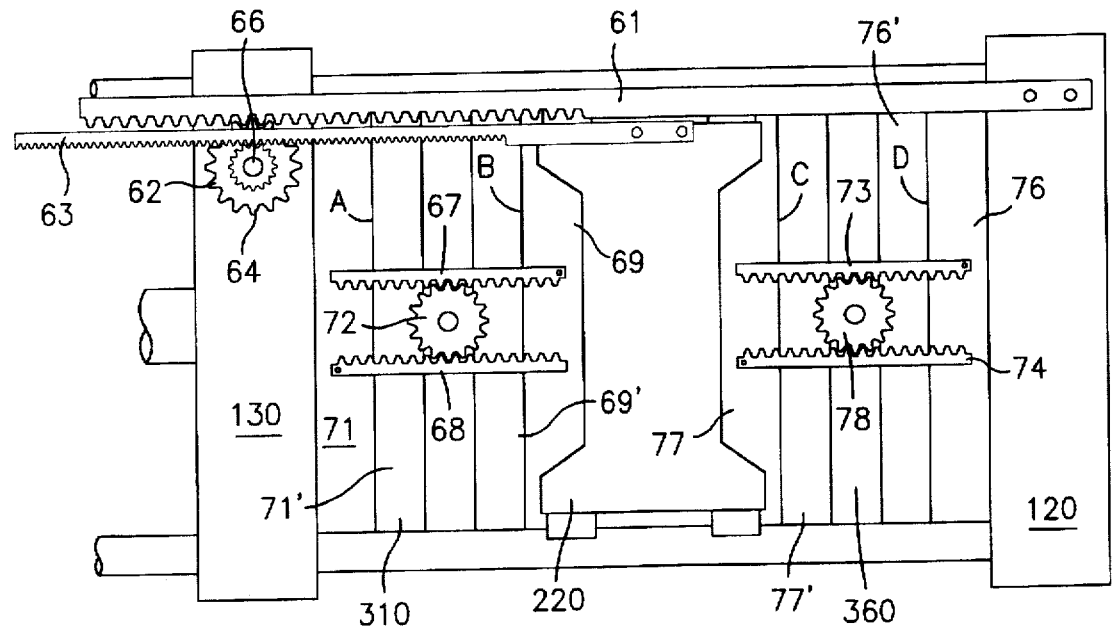
FIG. 7 shows, schematically, an alternative mechanism for opening and closing molds; the mold stations A, B, C and D are shown in the closed condition.
Figure 8:
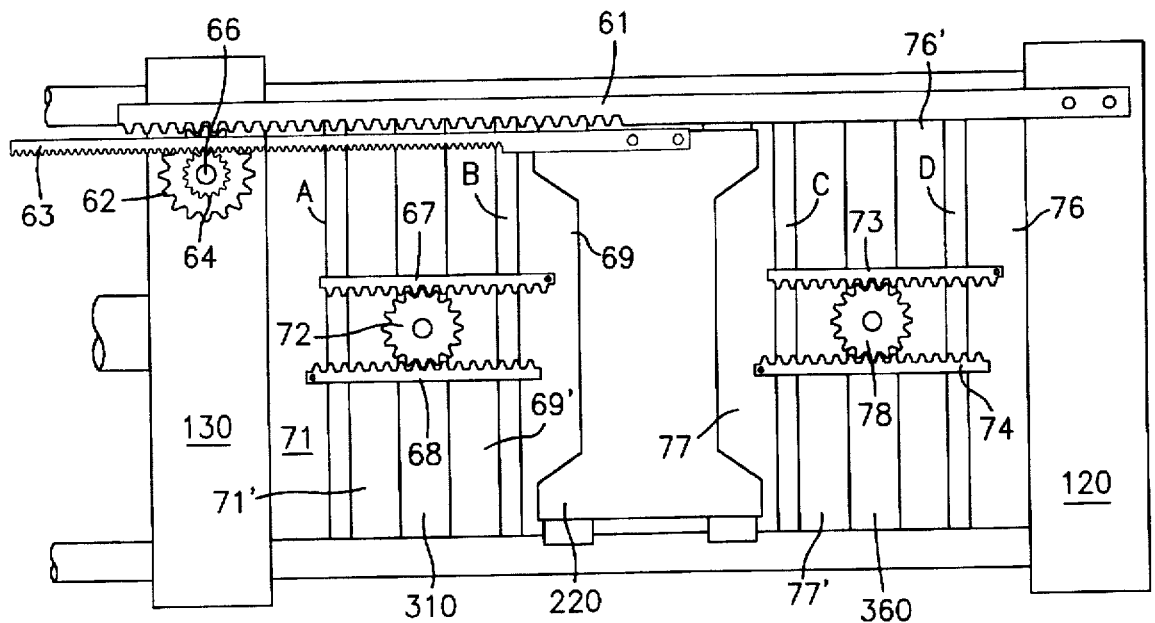
FIG. 8 is similar to FIG. 7 showing the mold stations in the open condition.

Referring to FIG. 7, an alternative mechanism for opening and closing the mold plates is shown schematically wherein fixed platen 120 and movable platen 130 straddle mold stations A, B, C and D, illustrated in the closed condition.

A rack 61 (first rack) is fastened at one end to fixed platen 120 and the opposite end is supported and engaged by pinion 62 (first pinion) carried by movable platen 130.

A primary rack 63 (second rack) is fastened at one end to a set of central mold plates (first set) via plate support member 220 and the opposite end is supported and engaged by pinion 64 (second pinion).

Pinions 62 and 64 are keyed together so that they rotate in unison upon shaft 66 secured to movable platen 130.

Secondary racks 67 and 68, at mold stations A and B, are fastened to mold plates 69 and 71, respectively, and engage pinion 72.

Secondary racks 73 and 74 at mold stations C and D are fastened to mold plates 76 and 77, respectively and engage pinion 78. Pinions 72 and 78, mounted on mold plates 310 and 360, respectively are identical and operate in conjunction with their respective racks to open and close mold stations A, B, C and D in precise and simultaneous fashion during the molding cycle. That is, the opening and closing strokes of the molds at stations A, B, C, and D are identical and occur simultaneously.

The relative mechanical advantage among the pinions 62,64 and identical pinions 72 and 78 is such that upon moving the movable platen 130 in an opening stroke (by well known means) to open all mold stations, platen 130 moves a distance x, central mold plates in members 220 move a distance x/2 and the mold plates 310 move a distance 3x/4, and mold plates 360 move a distance x/4 (all in the same direction) so that all mold stations open precisely and with a uniform opening dimension.

It is to be understood that mold plates 69 and 77 are mounted upon opposed sides of member 220, plate 71 is mounted upon movable platen 130 and plate 76 is mounted upon fixed platen 120. Mold plates 69' and 71' are mounted upon opposed sides of plate 310 while mold plates 76' and 77' are mounted upon opposed sides of plate 360.

The differential movement described above is achieved by selecting the diameter and therefore the peripheral measurement of the several pinions so as to generate the desired linear motion of member 220.

Motion of the member 220 operates to open mold stations C and D in response to the action of racks 73 and 74 cooperating pinion 78.

Figure 9:
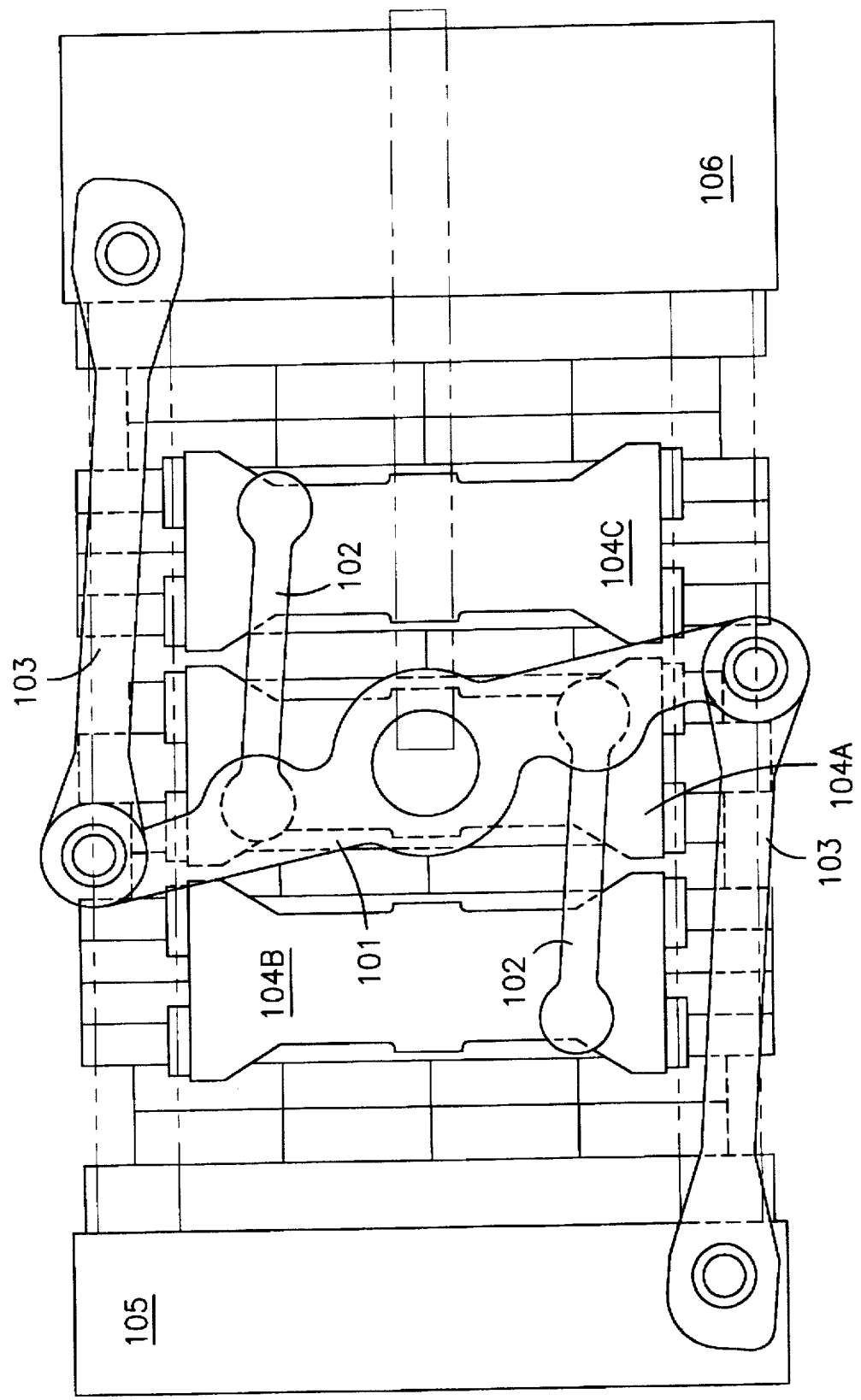
FIGS. 9 and 10 show an alternate embodiment of the present invention.
Figure 10:
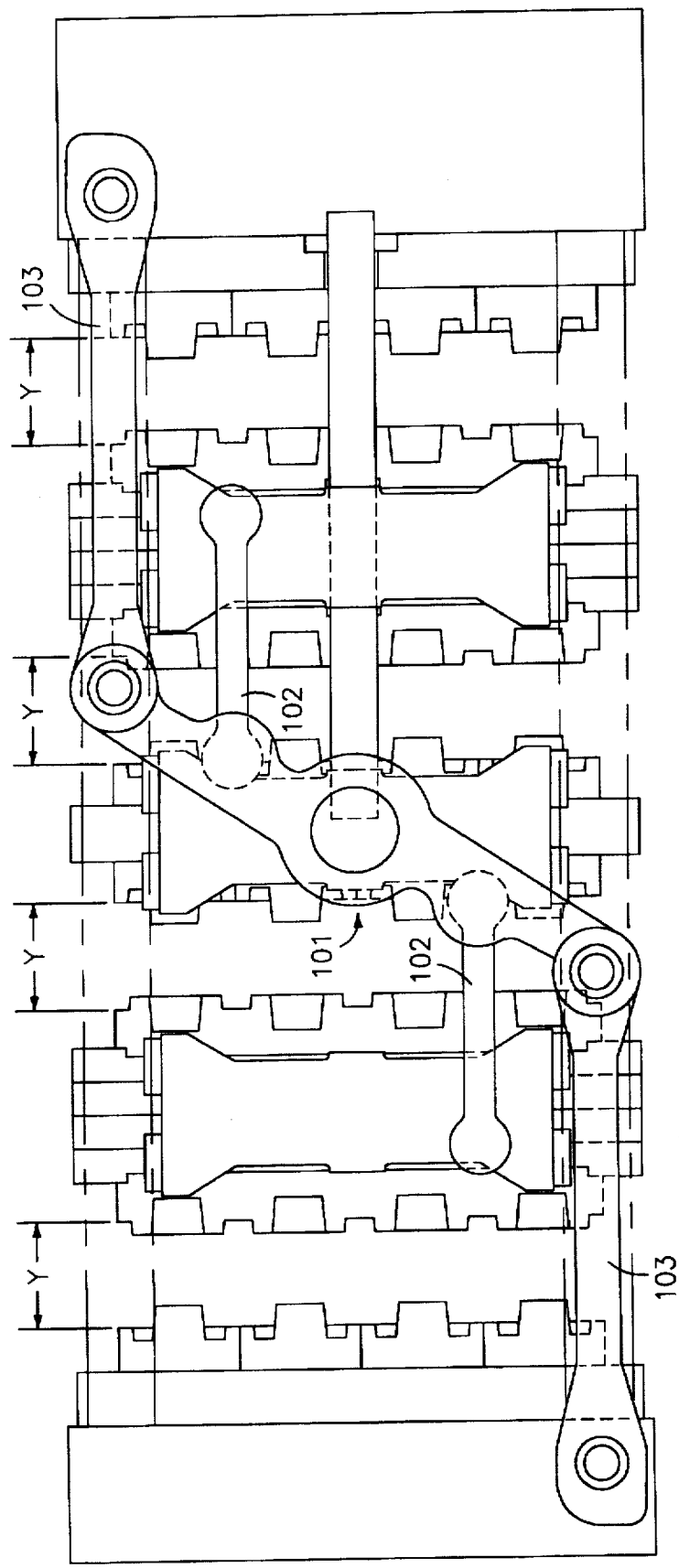

FIGS. 9 and 10 show an alternate embodiment of the present invention, with FIG. 9 showing the mold closed position and FIG. 10 showing the mold open position. In this embodiment, there are three mold support members 104A, 104B and 104C, with each mold support member supporting respective mold plates and providing a carriage therefor. The previous embodiment used only one such support located centrally on the mold, with support for the second and third sets of mold plates coming from guide or support pins through the top of the mold plates which remained engaged even when the mold was opened. The disadvantage of the previously described design is that the secondary mold linkages could further be improved to provide greater access to the open spaces between the mold portions when the mold is in the open position.

The embodiment of FIGS. 9 and 10 does not use the long guide or support pins through the top of the mold which can bend or sag with heavy mold portions. Instead, the similar mold support members 104A, 104B and 104C each carry a portion of the mold assembly to locate and guide it during wide opening strokes, as clearly shown in FIGS. 9 and 10. The support members may run on precision alignment features of the molding apparatus, such as the tie bars or machine ways or the like. Separation between the mold portions is provided via linkages or secondary motion means 102 which are connected at one end to the respective mold support members and at the other end to the primary motion means 101. The second support means 104B and 104C is disposed between the respective secondary motion means 102. As the moving platen 105 is caused to move away from the stationary platen 106, link arms 103 insure that the center most portion of the mold remains equidistant between the two machine platens. Additionally, the secondary motion means 102 are caused to move since they are attached to the primary motion means 101. Secondary motion means 102 are designed and positioned such that they will maintain a equal spacing between the open mold portions as shown at Y in FIG. 10. In the embodiment of FIGS. 9 and 10, the pivot point of secondary motion means 102 on the elongated arm of the primary motion means is approximately halfway between the center pivot point of primary motion means 101 and its extreme pivot point with link means or arms 103. Additionally, secondary motion means 102 are approximately half the length of link arm 103 and is pivotably attached to the respective mold support members 104B and 104C such that it runs parallel to link arm 103 at all times. This insures that the spacings Y will be equal through the entire mold open movement, if so desired. The advantage of this embodiment is the more accessible area between the mold open spacing and a simpler mold movement actuation device with the relatively simple movements of the primary and secondary motion means.

It is anticipated that numerous variations and modifications may be derived without departing from the spirit and scope of the invention. For example, a variety of mechanisms may be devised to provide the motion for opening and closing the mold stations in precise fashion.

What is claimed is:

1. In an injection molding machine including a first stationary platen assembly and a second platen assembly movable relative to said first platen assembly, a mold arrangement comprising a plurality movable plates defining a plurality of mold halves between cooperating sets of mold plates wherein said sets of mold plates are disposed axially to define a plurality of axially arranged mold stations operable to open and close simultaneously during cyclic molding machine operation, the improvement comprising:
said plurality of sets of movable plates including at least one first plate and a first set of opposed mold halves mounted thereon,
primary motion means operative to move said first set of opposed mold halves,
said plurality of sets of movable plates including at least a second set of opposed mold halves on one side of the first set of opposed mold halves and at least a third set of opposed mold halves on the opposite side of the first set of opposed mold halves, wherein said first plate is spaced between said second and third sets of opposed mold halves,
a first secondary motion means operative to move said second set of opposed mold halves, and a second secondary motion means operative to move said third set of opposed mold halves, wherein said first secondary motion means is on one side of the at least one first plate and the second secondary motion means is on the opposed side of the at least one first plate,
said primary motion means being further directly connected to said stationary and movable platen assemblies,
said first secondary motion means, and said second secondary motion means being further connected so that movement of the primary motion means is operative to move said first and second secondary motion means, and wherein said first and second secondary motion means are operative to move said second and third sets of opposed mold halves, respectively, and wherein the combined action of said motion means is operative to open and close all of said axially arranged mold stations simultaneously.

2. The improvement of claim 1 including a first support means for receiving and supporting said at least one first plate.

3. The improvement of claim 2, wherein said at least one first plate includes a first set of plates.

4. The improvement of claim 3, wherein said plurality of movable plates includes a second set of plates and a third set of plates.

5. The improvement of claim 4, wherein movement of the primary motion means is operative to maintain said first set of plates equidistant from said first and second platen assemblies.

6. The improvement of claim 2, wherein said primary motion means is connected to said first support means at a primary pivot point.

7. The improvement of claim 4, wherein the first support means is disposed between the primary motion means and provides a carriage for the first set of plates, and including a second support means for receiving and supporting said second set of plates, and a third support means for receiving and supporting said third set of plates.

8. The improvement of claim 7, wherein the second support means is disposed between the first secondary motion means and provides a carriage for the second set of plates, and the third support means is disposed between the second secondary motion means and provides a carriage for the third set of plates.

9. The improvement of claim 1, wherein said first secondary motion means is further connected to one of (1) said primary motion means and (2) said at least one first plate, and said second secondary motion means is further connected to one of (1) said primary motion means and (2) said at least one first plate.

10. The improvement of claim 8, wherein the primary motion means defines an elongated arm and link means connected to opposed ends of said arm, a first link means connected to said first platen assembly and a second link means connected to said second platen assembly.

11. The improvement of claim 10, wherein the primary motion means includes a center pivot point and pivot points between said elongated arm and said first and second link means.

12. The improvement of claim 11, wherein the first and second secondary motion means include pivot points on said elongated arm of the primary motion means approximately halfway between the center pivot point and the respective pivot points between the elongated arm and said first and second link means.

13. The improvement of claim 12, wherein the first and second secondary motion means are approximately one-half the length of the link means and are pivotably attached to their respective support means such that the secondary motion means runs parallel to the link means insuring that spacing between the mold arrangement will be equal during open and close.

14. The improvement of claim 1, wherein said primary motion means is an element which is separate and spaced from said first and second secondary motion means.

15. The improvement of claim 14, wherein said primary motion means comprises a primary elongated crank arm and wherein said first secondary motion means comprises a first secondary elongated crank arm, said primary elongated crank arm being an element which is separate and spaced from said first secondary elongated crank arm.

16. The improvement of claim 1, wherein said primary motion means includes a first group of pivot points for allowing pivotal motion including a primary pivot point and wherein said first secondary motion means includes a second group of pivot points for allowing pivotal motion including a second pivot point, wherein said first group of pivot points are independent of said second group of pivot points.

17. The improvement of claim 1, wherein said primary motion means comprises a primary elongated crank arm, said first secondary motion means comprises a first secondary elongated crank arm, and said second secondary motion means comprises a second secondary elongated crank arm.

18. The improvement according to claim 17, wherein said primary, first secondary, and second secondary crank arms are elements which are separate and spaced from each other.

19. The improvement of claim 4, further including:

a pair of primary motion means, said first support means for receiving and supporting said first set of plates, said first support means being disposed between the primary motion means, and providing a carriage for said first set of plates, said primary motion means defining an elongated crank arm, and link means connected to opposed ends of said crank arm, a first link means connected to said movable platen assembly and a second link means connected to said stationary platen assembly, said first secondary motion means defining a first secondary elongated crank arm, and pivot links connected to opposed ends of said first secondary crank arm, a first pivot link connected to one of said first set of plates and said primary motion means, and a second secondary elongated crank arm for moving said third set of plates, said second secondary elongated crank arm connected to said third set of plates at a third pivot point, and pivot links connected to opposed ends of said second secondary crank arm, a third pivot link connected to one of said first set of plates and said primary motion means.

20. The improvement of claim 3, wherein said first secondary motion means is directly connected to one of said first set of plates.

21. The improvement of claim 1, wherein said first secondary motion means is directly connected to said primary motion means.

22. The improvement of claim 15, wherein said second secondary motion means comprises a second secondary elongated crank arm, said primary elongated crank arm being an element which is separate and spaced from said second secondary crank arm.

23. The improvement of claim 1, wherein the primary motion means defines an elongated arm and link means connected to opposed ends of said arm, a first link means connected to said first platen assembly and a second link means connected to said second platen assembly.

24. The improvement of claim 23, wherein the primary motion means includes a center pivot point and pivot points between said elongated arm and said first and second link means.

* * * * *